US012314238B2

(12) United States Patent
Palm

(10) Patent No.: US 12,314,238 B2
(45) Date of Patent: May 27, 2025

(54) LIST-BASED DATA STORAGE FOR DATA SEARCH

(71) Applicant: Cortex Innovations Gmbh, Kyffhäuserland OT Bendeleben (DE)

(72) Inventor: Peter Palm, Isernhagen (DE)

(73) Assignee: Cortex Innovations GmbH, Kyffhäuserland OT Bendeleben (DE)

( * ) Notice: Subject to any disclaimer, the term of this patent is extended or adjusted under 35 U.S.C. 154(b) by 0 days.

(21) Appl. No.: 18/249,639

(22) PCT Filed: Nov. 9, 2021

(86) PCT No.: PCT/EP2021/081011
§ 371 (c)(1),
(2) Date: Apr. 19, 2023

(87) PCT Pub. No.: WO2022/101156
PCT Pub. Date: May 19, 2022

(65) Prior Publication Data
US 2023/0394015 A1    Dec. 7, 2023

(30) Foreign Application Priority Data

Nov. 11, 2020   (EP) ..................... 20206967

(51) Int. Cl.
*G06F 16/215*   (2019.01)
*G06F 16/22*   (2019.01)
*G06F 16/23*   (2019.01)

(52) U.S. Cl.
CPC ............ *G06F 16/215* (2019.01); *G06F 16/22* (2019.01); *G06F 16/2365* (2019.01)

(58) Field of Classification Search
CPC .......... G06F 16/22; G06F 16/23; G06F 16/21; G06F 16/25
See application file for complete search history.

(56) References Cited

U.S. PATENT DOCUMENTS 6,542,896 B1    4/2003  Gruenwald
10,248,720 B1*  4/2019  Wesley ................. G06F 16/358
(Continued)

FOREIGN PATENT DOCUMENTS

EP    2365448 A1    9/2011

OTHER PUBLICATIONS

International Search Report for International Application No. PCT/EP2021/081011 dated Feb. 24, 2022.

*Primary Examiner* — Maher N Algibhah
(74) *Attorney, Agent, or Firm* — Harness, Dickey & Pierce, P.L.C.

(57) ABSTRACT

The invention relates to a method for storing data (114, 115, 116) in a data storage device (104), wherein the method comprises:
receiving (202) raw data (112) or access addresses for the raw data by a data processing and search system—DPS system (102);
parsing (204) the raw data by a plurality of different parsers in order to ascertain data objects each having one or more data values, and an object ID of each of the data objects, wherein one semantic concept is assigned to each of at least some of the data values;
automatically importing (206) the parsing results by the DPS system;
automatically storing (208) all of the parsing results in the form of redundancy-free data value lists (114, 115, 116) in the data storage device by the DPS system, wherein the redundancy-free lists comprise:
one or more concept lists (116), wherein each of the concept lists represents a particular semantic concept, and a non-redundant list selectively includes those of the imported data values to which the semantic concept of this concept list was assigned during parsing;

(Continued)

a concept-free list (115), wherein the concept-free list selectively includes those of the imported data values to which no semantic concept was assigned during parsing; and providing (210) the redundancy-free lists (114, 115, 116) by the DPS system in order to respond to a search request and/or to perform a data analysis.

19 Claims, 6 Drawing Sheets

(56) References Cited

U.S. PATENT DOCUMENTS

| | | |
|---|---|---|
| 2004/0015783 A1 | 1/2004 | Lennon et al. |
| 2014/0279864 A1* | 9/2014 | Lopyrev ............... G06F 16/258 |
| | | 707/755 |

* cited by examiner

Product datasheets for motors (JSON)

| | | |
|---|---|---|
| Product datasheet: | Motor CL 28378-RS-A123 | 302 |
| Type: | Three-phase motor | |
| Power: | 4kW | |
| Torque: | (Nm) 0.43/0.42 | |
| Speed: | (1/min) 1340/1608 | |
| Manufacturer: | Gelb AG | |
| Place of manufacture: | Produktionsstraße 3, 16321 Bernau | |
| Color: | silver | |
| Paint surface: | glossy | |
| Installable in: | MF-3000, MF-3020, MF-3100, MF-6000 | |

304   306

Product data table for paints (.xsl)

| # | Paint ID | Paint type | Color | Notes |
|---|---|---|---|---|
| [...] | [...] | [...] | [...] | [...] |
| 308 | L-467-HT7 | gloss paint | red | The surface must be cleaned... |
| 310 | L-467-HT8 | gloss paint | silver | The surface must be cleaned... |
| 312 | L-467-HT9 | matt paint | yellow | The surface must be cleaned... |
| 313 | L-467-HT23 | matt paint | silver | The surface must be cleaned... |
| [...] | [...] | [...] | [...] | [...] |

Message text (.txt)

Through sales of motors, Gelb AG achieved a profit of 30 million euros in the business year 2005. A profit of 4 million euros was achieved by trade with precious metals, in particular gold and silver. The company was founded in 1978 by Paul Schmidt.[...]

314   316   318

Commercial register extracts (.txt)

320

| | |
|---|---|
| Company: | Gelb-AG |
| Headquarters: | Kastanienallee 34, 56185 Wiesbaden |
| Founded: | 02.12.1978 |
| Director (first name, last name): | Martin Silber |
| Founder: | Paul Schmidt |

Description:
Gelb AG is a manufacturer of motors, transmissions and motor vehicle components.

Data storage device 104

402 — Color

| Values | O IDs |
|---|---|
| blue | 224, 278 |
| yellow | 312 |
| red | 308 |
| silver | 302, 310 313 |
| [...] | [...] |

404 — Manufacturer

| Values | O IDs |
|---|---|
| Gelb-AG | 302, |
| SAP-AG | 105, 923 |
| Sony-AG | 105, 222, 235, 299 |
| [...] | [...] |

406 — Paint IDs

| Values | O IDs |
|---|---|
| L-467-HT7 | 308 |
| L-467-HT8 | 310 |
| [...] | [...] |

CONCEPT-FREE 115

| Values | O IDs |
|---|---|
| [...] | [...] |
| 2005 | 314 |
| achieved | 314 |
| by | 314 |
| Gelb-AG | 314 |
| business year | 314 |
| cleaned | 308, 310, 312, 313 |
| profit | 314 |
| MF-3000 | 302, 304, 267 |
| MF-3020 | 302, 304, 267 |
| MF-3100 | 302, 304, 267 |
| MF-6000 | 302, 304, 267 |
| motor | 314 |
| must | 308, 310, 312, 313 |
| surface | 308, 310, 312, 313 |
| sale | 314 |
| [...] | [...] |

408 — Last name

| Values | O IDs |
|---|---|
| Huber | 299 |
| Müller | 224 |
| Schmidt | 320, 287 |
| Silber | 320 |
| Stolze | 177, 299 |
| [...] | [...] |

410 — Rel. type: Installable_in

| Values | O IDs |
|---|---|
| Installable_in_MF-3000 | 302, 304, 267 |
| Installable_in_MF-3020 | 302, 304, 267 |
| Installable_in_MF-3100 | 302, 267 |
| Installable_in_MF-6000 | 302, 304, 243 |
| [...] | [...] |

412 — Metal types

| Values | O IDs |
|---|---|
| lead | 243 |
| iron | 245, 256, 232 |
| copper | 223, 56 |
| silver | 278, 299, 256 |
| zinc | 257, 278 |
| [...] | [...] |

Global list 114

| Values | Concept lists |
|---|---|
| [...] | [...] |
| silver | color, last name, metal type |
| Stolze | last name |
| [...] | [...] |

Fig. 7

LIST-BASED DATA STORAGE FOR DATA SEARCH

CROSS-REFERENCE TO RELATED APPLICATIONS

This application is a national phase under 35 U.S.C. § 371 of PCT International Application No. PCT/EP2021/081011 which has an International filing date of Nov. 9, 2021, which claims priority to European Application No. 20206967.0, filed Nov. 11, 2020, the entire contents of each of which are hereby incorporated by reference.

FIELD

The invention relates to a method and system for processing and storing data for searching the data.

PRIOR ART

In the prior art, various database management systems (DBMSs) are known for storing, managing and efficiently processing data. The primary task of DBMSs is to store large quantities of data efficiently, without contradiction and permanently, and to make required subsets available to users and application programs in different, needs-based forms of presentation. The basis for structuring the data and their relationships to each other in a database managed by a conventional DBMS is the database model, which is defined by the DBMS manufacturer. Depending on the database model, the database schema must be adapted to specific structuring options. The known database models used today include hierarchical models, network-type models, relational models (organized in tables), object-oriented models, document-oriented models, as well as mixed forms of these models. Furthermore, a distinction is made classically between DBMSs that are optimized for efficiently answering many small queries (OLTP) or long-lasting evaluations (OLAP).

With traditional DBMSs, already at the time of choosing the DBMS and also when defining the internal structures of the database managed by the DBMS (in particular size, number and internal references of database tables, selection of the type of columns for which an index will be created, etc.), it is necessary for the database developer to consider both the content (the information content) of the data to be managed and the type of requests that the DBMS is likely to have to handle.

The problem is that both aspects may change over time and are often not known or not fully known at the time when the database was created. Thus, in practice, it is often the case that other or additional aspects of the data stored in the database turn out to be relevant over time and new queries have to be formulated that could not be taken into account at the time of the initial database creation. For example, if the database contains medical data, and after the database is created, new medical knowledge is obtained that a combination of several symptoms is predictive of a particular diagnosis, the database data may contain the symptoms, but the symptoms may be distributed among different tables and/or indexed in such a way that the query becomes inefficient, thus consuming a great deal of RAM, CPU capacity, and time. However, a subsequent structural adjustment of a database once it has been defined is extremely time-consuming, error-prone and often no longer possible at all due to the numerous dependencies within the data in the database as well as with regard to client systems.

In addition, the problem often arises that, in the course of time, further data sources have to be integrated into the database, but their internal structure does not fit the data model selected when the database was created. If, for example, a database with a relational data model was selected and additional data are now to be integrated that are structured hierarchically, it is often not possible to store the additional data in the database in this way, even though the additional data may be conceptually linked to the data already in the database. And even if it is possible to store the further data in an inherently unsuitable data model, a common query and semantic integration of the existing and the further data is not possible, at least not without a fundamental redesign of the data organization in the database.

Thus, existing DBMSs are often characterized by structural inflexibility, poor extensibility and/or poor performance, especially when processing complex requests relating to a large amount of data objects with very many different attributes (keys) and corresponding values. If additional and differently structured data must subsequently be stored in the database, it is often not possible to query and analyze existing and newly added data together in a way that is useful in terms of content, performance and resources. This is a problem particularly, but not only, in the context of the "Internet of Things", since very heterogeneous data are collected by various objects and sensors in terms of content and structure, and the composition and nature of these data often changes over time.

SUMMARY

It is the object of the invention to propose an improved method and system for storing data in such a manner that it is able to be searched efficiently.

The objects underlying the invention are each achieved with the features of the independent claims. Embodiments of the invention are described in the dependent claims. The embodiments listed below may be freely combined with one another, provided they are not mutually exclusive.

In one aspect, the invention relates to a method for storing data in a data storage device. The method comprises:
  receiving raw data or access addresses for the raw data by a data processing and search system—DPS system, wherein the raw data have different structures;
  parsing the raw data by a plurality of different parsers in order to ascertain data objects each having one or more data values, and an object ID of each of the data objects, wherein one semantic concept is assigned to each of at least some of the data values;
  automatically importing the parsing results by the DPS system;
  automatically storing all of the parsing results in the form of redundancy-free data value lists in the data storage device by the DPS system, wherein the redundancy-free lists comprise:
    one or more concept lists, wherein each of the concept lists represents a particular semantic concept, and a non-redundant list selectively includes those of the imported data values to which the semantic concept of this concept list was assigned during parsing, wherein each of the data values in the concept list is assigned all of the object IDs of those data objects that include this data value, wherein the included data value is a representation of the semantic concept of this concept list;
    a concept-free list, wherein the concept-free list selectively includes those of the imported data values to which no semantic concept was assigned during parsing, wherein each of the data values in the concept-free list is assigned all object IDs of those data objects that include this data value, wherein no semantic concept could be assigned to the included data value of this data object during parsing; and providing the redundancy-free lists by the DPS system in order to respond to a search request and/or to perform a data analysis.

This may be advantageous because raw data that are highly heterogeneous in terms of structure and content are transferred into a common structure that allows fast and efficient processing of even large quantities of data (intersection, union, difference or symmetric difference sets of object IDs of elements of several lists), and which are extensible at any time both in terms of content (by adding further, preferably automatically generated concept lists) and in terms of the queries and analysis processes supported, without having to make a fundamental change to the structure of the data within the data storage device for this purpose. Since the lists are redundancy-free, each data value is contained only once in a list. If it occurs in several data objects of the raw data, this data value occurring once in the list is stored linked with these several object IDs. Thus, even very large data sets may be processed quickly and efficiently even by computer systems with little RAM and/or low CPU capacities. In particular, if the raw data contain certain data values multiple times (e.g., for texts representing a specific combination of a finite set of existing words, or for proteins representing a specific sequence of a finite set of amino acids), this form of data representation may lead to an enormous data compression effect. For example, the object IDs may each represent a data set (e.g., protein sequence ID, raw data file URL, natural-language text or sentence, row in an Excel file, etc.) and the data value is a value occurring in this data set (e.g., word, bit string, numeric value, etc.).

The assignment of semantic concepts to the data values is typically part of the parsing process.

According to embodiments of the invention, the DPS system thus stores the imported data values in redundancy-free data value lists depending on the semantic concept assigned to them (if this could be determined during parsing or was otherwise predetermined), wherein the storage and distribution of the data values into the lists are independent of the original affiliation of the data value to the data objects.

Thus, embodiments of the invention have the advantage of enormous flexibility, as far as the integration of large quantities of data that are heterogeneous in terms of structure and content is concerned, moreover with very high performance of data analyses and search processes, since the original assignment of data values to data objects is resolved in structural terms during import into the data storage device: the assignment of the data values to the objects is reflected exclusively in the object IDs, but otherwise has no effect on the structure of the data managed by the DPS system: regardless of whether the raw data are provided hierarchically, in tabular form, or as an XML file, regardless of whether the data values have already been largely predefined in the raw data (e.g. by key-value fields) or dynamically obtained by one of the parsers in an analysis process (e.g. pattern recognition on image or audio data): the data values are always stored within redundancy-free lists linked to the object IDs containing the data values. In this storage, the semantic concept that a data value represents is taken into account by selectively storing the data value into the concept list that represents this very concept. If the data value is already present in this list, only the set of object IDs is added accordingly. If the semantic concept behind a data value could not be ascertained at the time of parsing the raw data, these data value are stored in the "concept-free" list or if the data value already exists there, only the corresponding entry is extended by an object ID.

The import process may thus be understood as a process for resolving all data object structures, in which the totality of all data values extracted from all data objects of the raw data is stored in redundancy-free data value lists based on the semantic concepts assigned to them.

For example, various data sources such as JSON files, XML files, database tables, media files, or user inputs may be provided to the DPS system via a user interface, e.g., a graphical user interface. Provisioning may be accomplished, for example, by the DPS system receiving the raw data (original or copy), e.g. over a network or from a local data storage device, or other source, and first storing a copy in its own document store. This may have the advantage that the original is still available and may be used, if necessary, for the purpose of displaying the search or analysis result, or for parsing processes and analyses that are only supplemented later. However, it is also possible that the raw data are not stored as a copy in a document store of the DPS system, but that the DPS system is only given (permanent or temporary) read access to the raw data in order to be able to process and parse them. In this case it is sufficient if the DPS system receives the access addresses for the raw data.

Embodiments of the invention may have the advantage that data objects described by a very large number of properties (values) with respect to a wide variety of semantic concepts (keys) (even thousands per object) may be queried for any combination of a wide variety of key-values with very short query times, without having to follow a default that depends on the original structure of the data objects (as is the case, for example, with search requests in relational, index-based DBMSs with respect to the table and index structures in the database). In index-based systems, this would require indices of all possible combinations of all keys. The amount of indices in conventional index-based DBMSs therefore grows with the factorial of the keys! Especially with a multitude of different object types with a multitude of different semantic concepts, the number of required indices grows in order to match any conceivable combination of key-related search criteria with the factorial of the Keys! According to embodiments of the invention, on the other hand, generation and use of an index (in the sense of a searchable data structure, e.g. B-tree, generated in addition to the data values), is not required. According to embodiments, a non-redundant concept list corresponds to each semantic concept, in which each data value of this concept—in contrast for example to the data-set-based tables of a relational DBMS—occurs only once. Thus, according to embodiments of the invention, a search and/or analysis may be performed without the need to generate, for this purpose, suitable index structures for the expected search requests. Rather, the search may be performed directly in the redundancy-free lists, wherein preferably only those concept lists (and, as applicable, also the concept-free list and/or a global list) which correspond to the semantic concepts to which the search criteria refer are used.

According to embodiments of the invention, the data storage device is a volatile or non-volatile data storage device. For example, the data storage device may be a hard disk drive (HDD) or a mass storage device—solid state drive (SSD) or a RAM (in memory storage and management of lists).

According to embodiments of the invention, at least some of the raw data are present in the form of a multitude of data structures or received in the form of a multitude of data structures. In particular, the multitude of data structures may comprise a mixture of two or more of the following data structures:

XML file;
JSON file;
text file;
CSV file;
database table;
object tree;
media file, in particular video, audio and/or image file;
data entered via a GUI;
streaming data.

Streaming data are data that are generated continuously by source systems and sent in packets and/or within queues (according to the FiFo principle). Typically, these data are processed by a streaming framework in "real time". A streaming framework receives this stream of data and processes the information in the RAM before then writing it to a data storage device (e.g., hard disk drive (HDD) or mass storage device—solid state drive (SSD)). Also, according to embodiments, the DPS system may be designed to perform real-time processing of streaming raw data. Streaming data may be, for example, log data from an ERP system, e-commerce events (views, orders, baskets), tracking events on mobile apps, geolocations from web applications, or usage data from specific products.

However, this list is not to be understood as exhaustive.

According to embodiments, at least some (typically most) of the non-redundant lists contain data values that were contained in two or more of the different data structures containing the raw data. Thus, the question of in which data structures a data value occurs in the raw data does not affect the structure of the lists managed by the DPS system. This may be advantageous because the system is thus independent of the structure of the files and databases containing the raw data.

The raw data may be data of the most diverse content and the most diverse structure. This may be advantageous because the use of the DPS system allows the integration of a large amount of heterogeneous data from many independent sources into a common data structure (non-redundant data value lists). Through this, it is not only possible to compress the quantity of data enormously, but also to integrate it semantically, at least if the raw data from two or more different sources have at least one type of data value that represents the same semantic concept and this is also recognized during the parsing process. In this case, the data values of this concept are stored linked with references to the various data objects in the same concept list.

It is also particularly advantageous that it is not necessary to fully semantically integrate the data objects from the different sources. For example, if the raw data are protein sequences or gene sequences, and, in the course of a parsing process of these data, certain peptide sequences or genomic markers are recognized that represent the concept "predictors for diagnosis X" and are also present in the raw data of other data sources, it is harmless if the parsers used are unable to recognize and extract all semantic concepts that may be present in the raw data of one data source. Thus, a complete "understanding" or a complete "data model" is not necessary to integrate data from different heterogeneous sources. However, if at least one or some data values of certain semantic concepts are found when parsing the raw data of different data sources, they may be classified into the corresponding list and thus integrated.

Even if the semantic concept is unknown, integration of the heterogeneous data is possible on a correlation basis: if, for example, certain genomic markers are frequently mentioned in the literature together with a certain diagnosis, this leads to the fact that the intersection set of the object IDs of the data objects containing the genomic marker on the one hand and the diagnosis on the other hand is very large (larger than would be statistically expected given the frequency of occurrence of the individual data values). If the biological function and, consequently, the semantic concept behind this marker is not known, the marker is stored as a data value in the concept-free list and may thus be taken into account when processing search requests or data analyses, e.g. correlation analyses, completely independently of whether the genomic marker was provided in an XML file, a text file or some other format.

Embodiments of the invention thus also have the advantage of being very flexibly expandable: Since neither the structure of the data objects in the raw data nor the type and number of attributes of the data objects have any influence on the structure of the data managed by the DPS system (in any case, these are stored in the form of non-redundant lists), further raw data may be imported and integrated in new structures at any time. If the structure of the raw data was not known before, it is merely necessary to develop an appropriate parser which processes the raw data, if possible assigns semantic concepts to the data values contained in the raw data, and, depending on the presence and type of the assigned semantic concept, stores the data value together with the object ID of the data object concerned, or at least the object ID, in the concept-free list or one of the concept lists.

According to embodiments, the method comprises performing the search request and/or analysis by the DPS system or another DPS system.

According to embodiments, the search request and/or data analysis is performed particularly without access to the raw data.

According to embodiments, the DPS system is configured to perform the analysis and/or search exclusively based on the redundancy-free lists or on data derived from these lists by the DPS system, wherein the analysis and/or search is in particular not performed on the raw data or the data objects contained therein or data sets representing these data objects.

This has the advantage that the search and analysis does not depend on the structure of the raw data and even raw data volumes in the terabyte range may be compressed and processed to a size that they are able to be quickly processed and searched with complex search requests by standard computers and partly even single-board computers such as Raspberry Pi. The compression relies on each data value occurring only once in each concept list and the concept-free list. It is indeed possible for a data value such as "silver" to occur in two or more concept lists if it is assigned several different semantic concepts (last name, color, metal type). However, the value "silver" occurs only once in each list. If the data value "silver" is found in further data objects in which the data value "silver" represents the concept "metal", then the list element "silver" is selectively additionally assigned the object IDs of these data objects in the list that represents the concept "metal types". If, when parsing certain raw data, the parser is unable to determine whether the data value "silver" represents a color, a metal, a last name, or even another semantic concept not previously represented as a list, then this data value "silver" is stored in the concept-free list. It is thus possible that the data value "silver" occurs several 1000 times in the raw data, but occurs only once or a few times in the lists on which the DPS system operates. The object IDs are preferably stored in the form of numerical values, which consume little memory and on which fast set operations may be performed. Thus, complex search requests, e.g. for all data objects containing the product type "line material" and "silver" as "metal type", may be answered by calculating an intersection set of the object IDs from the set of object IDs assigned to the data value "line material" in the concept list "product type" and to the data value "silver" in the concept list "metal type". Thus, the data analysis no longer needs the structure of the data objects contained in the raw data.

According to embodiments, the data storage device managed by the DPS system is free of the data objects (which may also be described as data sets).

According to other embodiments, the DPS system additionally manages a document storage device in which all or at least some of the data structures containing the raw data are stored. However, again, these raw data are not used for the purpose of processing search requests or for data analysis, but for other purposes. For example, it may be advantageous to store a copy of the raw data in the document storage of the DPS system so that at a later time, when additional and/or better parsers are available, the parsing process may be performed again on the raw data to recognize and extract additional data values and/or semantic concepts assigned to them that could not be recognized or parsed by the previously used parsers. This may reduce network traffic because the raw data stored in systems connected over a network does not need to be retransmitted when a new or better parser is available.

According to embodiments of the invention, the redundancy-free lists further comprise a global list. The global list is a redundancy-free list of all imported data values, wherein each data value in the global list is assigned one or more pointers, wherein each of the pointers points to an element of one of the concept lists or an element of the concept-free list that includes a data value identical to this data value. The DPS system is configured to perform the analysis or the requested search at least also on the global list, wherein the global list serves for recognition and/or for concept-specific processing of data values that represent different semantic concepts in various data objects.

Preferably, no object IDs are assigned to the data values in the global list. For example, the global list would contain the data value "silver" only once. While no object IDs are directly assigned to this data value in the global list, it is assigned pointers to one or more concept lists representing semantic concepts to which the data value "silver" is assigned in at least one of the data objects. In this example, the data value "silver" in the global list would thus be assigned the concept lists "last name", "metal type", and "color". If the silver data value is also stored in the concept-free list, the "silver" data value would also be assigned the concept-free list.

The use of the global list may thus have the advantage that for each data value it may be immediately determined whether—depending on the context—it represents different semantic concepts and, if so, how many and which ones. Since preferably only the data values of the individual concept lists or the concept-free list are directly assigned the object IDs, the data objects containing the data value "silver" according to a certain concept may be easily selected and distinguished from the data objects containing the word "silver" according to another concept.

According to one embodiment, the DPS system is configured to provide a GUI for entering a search term. During the entry of a search term, the DPS system searches the global list to determine whether the entered term corresponds to a data value of the global list. The DPS system suggests to the user one or more determined data values that are at least partially identical or similar to the previously entered search term. For example, the DPS system may display to the user the determined data values in a context menu or auto-complete list for selection by the user. When the user selects one of the suggested data values, the DPS system determines the number and type of semantic concepts (and corresponding concept lists) referenced by that data value in the global list. The semantic concepts thus determined are also displayed on the GUI, allowing the user to select one or more of these semantic concepts via the GUI. Thus, for example, when entering the search term "silver", the user learns that several concepts (last name, metal type, color) are known for this search term. The user is allowed to select these concepts, e.g. by means of so-called "check-box", "drop-down lists", "radio button" GUI elements or the like, and thereby narrow down the search request to a specific semantic concept. For example, selecting the concept "metal type" limits the search to those data objects that contain the data value "silver" as the identifier of a metal. The object IDs of these data objects are all stored in the "metal type" concept list and assigned to the "silver" list element.

According to embodiments of the invention, at least some of the data values are extracted from fields of data structures containing the raw data. The fields are defined by the data structures. The fields include one or more concept-related fields and/or one or more concept-agnostic fields.

A field may be, for example, a cell of an Excel file, an element of a database table, a specific XML element within an XML object tree, or the like. It corresponds to a predefined container within a data structure that is used to store one or more data values. A concept-related field is a field that has a field identifier assigned to it, wherein the field identifier represents a semantic concept. A concept-agnostic field is a field that is free of a semantic meaning assignment. Typically, at least some of the data values of the raw data are stored in concept-related fields and/or some other data values of the raw data are stored in concept-agnostic fields. For example, if an Excel table is parsed, neither the columns nor the rows of which contain an identifier of a semantic concept of the data contained in the table, the fields may be considered concept-agnostic fields. However, if field identifiers are present, such as "first name", "last name", "date of birth", "date of manufacture", "weight", etc., they are concept-related fields.

Parsing and importing data values stored in concept-related fields may be advantageous because new semantic concepts may hereby be "learned" automatically and integrated into the DPS system. Also, an immense learning effect may be achieved with a few parser types: by defining a parser that interprets the data values in cells of the first row of the table as semantic concepts to which the data values below these cells in the same column are to be assigned, this parser may be used to import both new semantic concepts and new data values from any Excel table that follows the scheme that the semantic concepts of the particular column are contained in the first (title) row. If the DPS system recognizes during the import of the data values of a "last name" column that the semantic concept "last name" was hitherto unknown (i.e. no concept list exists for "last name"), such a concept list will be created automatically by the DPS system and all data values of this column will be stored redundancy-free in this list.

According to embodiments of the invention, the DPS system stores those of the data values extracted from the concept-related fields in that one of the concept lists that represents the semantic concept of the field identifier of those concept-related fields. According to embodiments, the DPS system stores those of the data values extracted from the concept-agnostic fields exclusively in the concept-free list if the parser used does not recognize a semantic concept of the data value.

According to embodiments of the invention, at least some of the data values are imported by semantic parsers that recognize the imported data values as well as the semantic concept assigned to them on the basis of a data analysis, wherein the data analysis is in particular an image analysis, an audio signal analysis, a statistical analysis, a classification method, a machine learning method, and/or a pattern recognition method. According to one embodiment, the plurality of parsers used includes a parser that classifies audio data and converts it into text, which is then broken down into words that are used as data values. Additionally or alternatively, the parser may evaluate the audio data to recognize a music genre and treat the audio data in its entirety as a data value to which the automatically determined music genre (e.g., rock, techno, classical) is assigned as a semantic concept.

Thus, it is possible that even if no field identifier indicates the semantic concept to which a data value is assigned, the semantic concept will still be recognized during the parsing process. For example, the raw data may be digital images and the parser may be image analysis software capable of recognizing specific objects (people, animals, plants, etc.). The images or image segments in which a particular object has been recognized are given an object ID, and the image (or the pixel data of the corresponding image segment, or just the name of the recognized object ("human", "dog", "cat", etc.) is stored as a parsed "data value" in a corresponding concept list ("human" or "dog", etc.). Thus, whether a data value is able to be recognized and extracted in the raw data and whether a semantic concept is able to be assigned to this data value may depend on the field identifiers and/or the parsers used.

If the redundancy-free data value lists do not yet contain a concept list for a dynamically recognized new semantic concept (new music style, new object type in image data), the DPS system preferably automatically creates a new concept list for this semantic concept.

According to embodiments of the invention, the method further comprises:
  after the data values are imported and stored, providing a further parser which is designed to recognize and import data values assigned to at least one new semantic concept. A new semantic concept is a concept not represented by any of the concept lists currently contained in the data storage device
  processing the raw data by the further parser, wherein one or more new data values are extracted from the raw data assigned to the at least one new concept;
  comparing the at least one new semantic concept recognized by the further parser with the concept lists in the data storage device by the DPS system and automatically generating and storing a new concept list for each of the at least one new semantic concept for which the further parser has extracted at least one data value; and
  automatically storing the data values extracted from the raw data by the further parser into those of the at least one new concept list representing the new semantic concept that the further parser has assigned to this data value.

Preferably, the concept-free list and/or the global list is also updated in such a way that the object IDs of data objects assigned to the data value and which contain the data value to which the new parser was able to assign the new concept for the first time are deleted in the concept-free list. After all, these object IDs are assigned to this data value in the new concept list. For this data value, the object IDs of those data objects that contain the data value but to which the additional parser was also unable to assign a concept remain in the concept-free list.

Thus, the same raw data may also be subsequently evaluated by new and improved parsers, and the knowledge extracted in the process may be seamlessly integrated into existing list structures and made searchable.

According to embodiments, the method further comprises:
  receiving a search request for ascertaining data objects that satisfy one or more concept-related search criteria and/or one or more concept-agnostic search criteria, wherein a concept-related search criterion is a search criterion to which an identifier of a semantic concept is assigned, wherein a concept-agnostic search criterion is a search criterion to which no semantic concept is assigned;
  searching the concept-free list for one or more data values that satisfy each of the received concept-agnostic search criteria; for example, the search may be a search for identical or similar data values in relation to the search term; for example regular expressions may be used for similarity searches; and/or
  for each of the received concept-related search criteria, searching selectively those of the concept lists representing the semantic concept of this search criterion for one or more data values satisfying the concept-related search criterion;
  returning the object IDs or a subset of these object IDs assigned to data values ascertained during the search of the global list and/or the at least one concept list in response to the search request by the DPS system.

Due to the immense compression and the automatic splitting of the data values into different lists depending on the semantic concept, even immense quantities of raw data are able to be processed very quickly even on low-performance computers after transforming the data values contained in the raw data into the list structures.

According to preferred embodiments of the invention, the data values of each of the lists are sorted, i.e., ordered according to an order relation (e.g., alphabetical order for data values consisting of alphanumeric strings). This may expedite searching the lists for particular data values, since the search may be aborted if, based on the order relation, it is determined after traversing a data value in the list that the data value cannot be contained in the list.

According to embodiments, using the redundancy-free lists) to perform the requested search and/or the data analysis comprises performing a set operation on sets of object IDs assigned to data values in two or more of the redundancy-free lists, wherein the set operation particularly comprises calculating an intersection set, a union set, a difference set, or a symmetric difference set.

For example, a plurality of concept lists and/or the concept-free list may each identify one or more data values ("match values") that are each identical or most similar to a search term of a search request. By applying a union set formation operation to the sets of object IDs respectively assigned to these match values of a single one of these concept lists, the totality in the union of those of the data objects containing all match values of this one concept list is ascertained. By applying an intersection set formation operation to the sets of object IDs obtained in the union set formation step for the various concept lists, the intersection set of those of the data objects that contain at least one match value for each of the concept lists to which a search criterion of the request was applied is ascertained. This intersection set may be returned as the result of the search request and/or used for further analysis.

According to embodiments, the data values of the concept-free list and/or the one or more concept lists are each stored linked with one or more time indications, wherein the time indications each include a transaction time for the initial generation of a data value or a time of import of a data value by the DPS system. The method further comprises a consideration of the time indications by the DPS system to answer the search request and/or perform the data analysis.

For example, the data value "Frankfurt" in the concept list "headquarters" may be assigned the time "as of 13 Mar. 1978" in conjunction with the object ID on a commercial register extract no. 238 of the company "Gelb AG", from which this time indication is taken. In addition, the data value "Berlin" in the concept list "headquarters" may be assigned the time "as of 16 Jul. 2012" in conjunction with the object ID on a commercial register extract no. 46474 from which this time indication is taken for the same company "Gelb AG". By querying all "headquarters" data values of the company "Gelb AG", it is therefore also possible to reconstruct a chronological progression of company headquarters relocations, since the data object and its object ID from which a data value was extracted is linked to this time specification.

According to embodiments of the invention, at least some of the data objects are provided in relation to other data objects. These relations may be, for example, relations such as "is part of", "includes", "belongs to class", "activated", "inhibited", "is_installable_in" or the like. The relations may already be contained explicitly or implicitly in the raw data and extracted during the parsing process. However, it is also possible that the DPS system extracts the relations only in the course of a data processing operation performed later on the raw data and/or on the data values of the redundancy-free lists already stored.

Each extracted relation of one of the data objects ("first data object") to another of the data objects ("second data object") is extracted in the form of a combination (in particular a concatenation) of a relation type (i.e., the identifier of the relation such as "is_installable_in" and the object ID of the second data object). Each of the extracted combinations is stored as one of the data values in the concept-free list and/or in the at least one concept list, wherein in the concept-free list and/or the at least one concept list each of the extracted combinations is assigned the object IDs of those of the first data objects to which the relation designated in the combination exists.

For example, such extraction and storage of object relations may be used to formulate "open" search requests that extract the context of a particular object, including the set of objects that reference this search object, as well as the nature of the relations.

According to embodiments, the object IDs of the data objects ascertained during parsing are also treated as data values and stored, e.g., in the concept list "object IDs" (and optionally additionally in the global list).

For example, the object ID of the data objects may be extracted as a data value and stored in an "object identifiers" concept list. The object identifiers concept list may be searched for a specific object ID (search object ID) to find a data value in this list that is identical to the search object ID. Then, the IDs of all data objects are determined that are assigned to this ascertained data value in the object identifier concept list. In addition to the data object that is identical to the search object, these are also all data objects that have a relation to the search object, because these also contain the object ID of the search object.

In addition to searching for an "identical" match as described above, it is also possible to search the global list using a regular expression containing the object ID of the search object. For example, the global list could contain many data values that map relations, such as "is_installable_in_motor_XL-3000", "is_power_equivalent_to_motor_XL-3000", "is_activated_by_p53_Gen", etc., wherein the components "motor_XL-3000" and "p53_Gen" represent object IDs. Using a search with a regular expression that specifies only the object ID as the search object ID and leaves the relation type identifier open, all data values may first be determined in the global list that contain the search object ID as a component of the data value, i.e. also all relation types that refer to the search object. The data values of the global list determined in this way refer to corresponding context lists, e.g., to the context lists for the semantic concepts "is_installable_in" and "is_power_equivalent_to". The concept list "is_installable_in" may contain a data value "is_installable_in_motor_XL-3000", which is assigned an initial set of object IDs. The concept list "is_power_equivalent_to" may contain a data value "is_power_equivalent_to_motor_XL-3000" which is assigned a second set of object IDs. The union set of the first and second set of object IDs thus results in the totality of data objects that are either "installable in" or "power equivalent to" the search object "motor_XL_3000".

According to embodiments of the invention, the method comprises:
  receiving a search request or an analysis command to ascertain all data objects that have a relation to a search data object, wherein the request or the command contains a search object ID;
  searching the global list to ascertain all data values that consist of a combination of a relation type and an object ID that is identical to the search object ID;
  identifying one or more concept lists referenced by the data values ascertained in the global list;
  searching the one or more identified concept lists to ascertain data values that consist of a combination of a relation type and an object ID that is identical to the search object ID;
  returning the object IDs assigned to the ascertained data values in the one or more concept lists, i.e. IDs of those data objects that have a relation to the search object.

Thus, highly complex search requests and also similarity searches (fuzzy searches with regular expressions) may be performed in a highly flexible, scalable and performant manner without having to create a database index in the form of a B-tree for this purpose and, as applicable, without having to adapt it when integrating new data object types or search requests. For each search object, it is thus possible to find out very quickly which relation types actually exist in relation to the search object and how many and which other objects reference the search object or are connected to it via one or more of these relation types.

This may be particularly advantageous in the context of "Industry 4.0" applications or when ordering and/or configuring highly complex components (aircraft turbines and motors): Complex parts or system components may consist of several thousand components, which in turn may consist of subcomponents. If an automobile or aircraft manufacturer's data pool contains a large quantity of components, this type of relation query makes it possible to determine very quickly for which data objects, for example, the relation "is-part-of-motor-XM-300049 BT" is applicable.

According to embodiments of the invention, the method further comprises:
  providing a mapping table by the DPS system, wherein the mapping table assigns one or more identifiers to each data value in the concept-free list and to each data value in each of the concept lists;
  generating obfuscated copies of the concept-free list and each of the concept lists by the DPS system, wherein in the obfuscated copies the data values are each replaced by an identifier assigned to this data value in the mapping table;
  using the obfuscated lists to perform the search request and/or analysis by the DPS system.

This may have the advantage of increasing the security of the data. For example, the mapping table and the obfuscated list copies may be provided on different computer systems and/or stored and used in separate IT security environments. If an unauthorized third party gains access to the obfuscated lists, they will not be able to identify the contents of the lists without the mapping table. Access to the mapping table itself is also harmless, since it does not contain any object IDs that would allow a reconstruction of the assignment of data values to objects. The unauthorized third party would therefore have to penetrate two separate computer systems or two separate security systems in order to reconstruct the original lists. Thus, a particularly secure data management and search procedure is provided.

According to embodiments, the identifiers are values of which the length and/or type depend on the processor architecture of the computer system used for the search and/or analysis, i.e. have been chosen in dependence on these factors. In particular, the length and/or type of the identifiers are chosen such that they may be processed very quickly by the processor architecture. For example, the length of the identifiers may correspond to the processing width of the processor architecture (e.g., 32 bits for 32-bit architectures, 64 bits for 64-bit architectures). If the processor architecture is able to process numeric values particularly efficiently, the identifiers may consist of numeric values. If the processor architecture is able to process other value types (e.g., symbols) particularly efficiently, the identifiers may consist of symbols.

According to embodiments, the search or analysis uses the mapping table to determine a search value identifier, wherein the search value identifier is an identifier associated with the search value in the mapping table.

According to embodiments of the invention, all identifiers have a fixed length, in particular an identical length, which is preferably selected such that each identifier fits completely into the working register of the ALU of the at least one processor performing the method according to embodiments of the invention. Thus, according to embodiments of the invention, the identifiers are compared with each other and/or with a search value identifier in a single clock cycle of the ALU.

This may be advantageous because replacing the data values with one or more of the identifiers may not only improve protection of the contents of the data from unauthorized access, but additionally may provide more efficient processing of the data in the course of processing the search requests and data analyses.

According to embodiments of the invention, the method further comprises:
  encrypting the concept lists and the concept-free list by the DPS system, or encrypting the obfuscated concept lists and the obfuscated concept-free list by the DPS system;
  in response to receiving the search request or a data analysis command, identifying those of the encrypted lists that need to be processed to handle the search request or the data analysis command;
  authenticating the sender of the search request to the DPS system, wherein the DPS system checks individually for each of the identified lists whether the sender is authorized to access the contents of the list;
  generating, by the DPS system, decrypted copies selectively of those of the identified lists for which the sender has authenticated themself as authorized to access;
  performing the search request or the data analysis on the decrypted list copies;
  after performing the search request or the data analysis, deleting the decrypted list copies by the DPS system.

This may have the advantage that the lists generated and managed by the DPS system are primarily unreadable, since they are encrypted. The cryptographic keys required for decryption are preferably stored securely, e.g. on an HSM or in a comparably secure environment. This means that an unauthorized third party who takes possession of the lists or a copy of the lists is unable to read the data they contain. Only in response to a search request or an analysis command are some of the lists that need to be read to answer the request temporarily decrypted. Thus, a flexibly extensible, resource-saving and at the same time still secure method for managing and searching data may be provided.

According to preferred embodiments, the DPS system uses a different encryption key for encrypting each of the lists. This may further increase security.

According to embodiments, at least one of the concept lists represents genomic markers of multiple individuals of a species or sub-species, wherein at least another of the concept lists represents metabolic or phenotypic characteristics of those individuals. The DPS system performs the data analysis using set operations on the lists. The data analysis includes correlation analysis of genomic markers on the one hand and the metabolic or phenotypic characteristics on the other. Thus, a new, very efficient way of performing so-called "genome-wide association studies—GWA" is provided.

According to other embodiments, at least some of the data values of the global list and/or the at least one concept list specify an "is-part-of" relation to other objects including an object ID of that other object, wherein at least another one of the concept lists represents metabolic or phenotypic characteristics of those individuals. The DPS system performs the requested search, wherein the search criterion includes a combination of the "is-part-of" relation type and an object ID, wherein the object ID of the search criterion represents a machine or a vehicle or a multi-component part of this machine or the vehicle.

According to other embodiments, at least some of the data values of the global list and/or the at least one concept list are words of a natural language. The DPS system performs the data analysis using set operations on the lists. The data analysis includes a correlation analysis of words to create a predictive model of this natural language.

In another aspect, the invention relates to a volatile or non-volatile storage medium on which computer-readable instructions are stored, wherein the instructions are designed to cause a processor to execute a method for storing data in a data storage device according to any one of the preceding claims.

According to one embodiment, the data storage device in which the redundancy-free data value lists are stored is a RAM. The RAM may be the RAM of a processor, in particular a processor of a single-board computer such as a Raspberry Pi computer.

In another aspect, the invention relates to a plurality of redundancy-free data value lists. The data value lists comprise a plurality of concept lists and a concept-free list. Optionally, the redundancy-free data value lists may also include a global list. The redundancy-free lists contain data values and object IDs of data objects, each of which contain one or more of these data values. Each of the concept lists represents a particular semantic concept, and a non-redundant list selectively includes those of the data values to which the semantic concept of this concept list is assigned, wherein each of the data values in the concept list is assigned all of the object IDs of those data objects that include this data value, wherein the included data value is a representation of the semantic concept of this concept list. The concept-free list selectively includes those of the data values to which no semantic concept is assigned, wherein each of the data values in the concept-free lists is assigned all object IDs of those data objects which include this data value, wherein no semantic concept is assigned to the included data value of this data object.

In a further aspect, the invention relates to a use of the redundancy-free data value lists for searching and/or analyzing the data values contained in these lists. In particular, the use of the redundancy-free data value lists may be performed by an electronic data processing system. Typically, the search and/or analysis is performed by the same DPS system that created the lists. However, it is also possible that the search is performed by a different system, e.g., a DPS system other than the one that generated the lists.

In another aspect, the invention relates to a computer system configured to search for data in electronic data repositories, wherein the computer system, during this search, is configured to use the redundancy-free data value lists to search for and/or analyze the data values contained in these lists.

In another aspect, the invention relates to a computer system for storing data. The computer system comprises at least one processor, a data storage device, and a data processing and search system—DPS system. The DPS system is designed to manage and search the data stored in the data storage device and is designed to cause the at least one processor to perform a method comprising:

receiving raw data or access addresses for the raw data by a data processing and search system—DPS system, wherein the raw data have different structures;

parsing the raw data by a plurality of different parsers in order to ascertain data objects each having one or more data values, and an object ID of each of the data objects, wherein one semantic concept is assigned to each of at least some of the data values;

automatically importing the parsing results by the DPS system;

automatically storing all of the parsing results in the form of redundancy-free data value lists in the data storage device by the DPS system, wherein the redundancy-free lists comprise:

one or more concept lists, wherein each of the concept lists represents a particular semantic concept, and a non-redundant list selectively includes those of the imported data values to which the semantic concept of this concept list was assigned during parsing, wherein each of the data values in the concept list is assigned all of the object IDs of those data objects that include this data value, wherein the included data value is a representation of the semantic concept of this concept list;

a concept-free list, wherein the concept-free list selectively includes those of the imported data values to which no semantic concept was assigned during parsing, wherein each of the data values in the concept-free list is assigned all object IDs of those data objects that include this data value, wherein no semantic concept could be assigned to the included data value of this data object during parsing; and providing the redundancy-free lists by the DPS system in order to respond to a search request and/or to perform a data analysis.

According to embodiments, the at least one processor contains an arithmetic logic unit—ALU configured to perform a set operation on sets of object IDs assigned to data values in two or more of the redundancy-free lists, wherein the set operation comprises, in particular, a calculation of an intersection set, a union set, a difference set, or a symmetric difference set. In particular, the set operations may be performed by the ALU such that a comparison of two object IDs is performed within a single clock cycle (comparison operation) of the ALU.

A "processor" is understood here to mean a (usually very much reduced and usually freely) programmable computing unit, i.e. a machine or an electronic circuit, which controls other machines or electrical circuits according to transferred commands and thereby drives an algorithm (process) which usually involves data processing. The processor may be formed, for example, as a main processor, a central computing unit or (more generally) central processing unit (CPU for short) for computers or computer-like devices in which they execute instructions. The processor may also be formed as a microcontroller in embedded systems (for example in household appliances, ticket machines, smartphones, etc.).

According to embodiments, at least one of the steps of the method is directly executed by a subunit of a processor.

In particular, according to embodiments of the invention, the set operations on the object IDs may be performed directly by the arithmetic logic unit (often abbreviated to ALU) of the at least one processor. An ALU may link two binary values with the same number of digits (n). Reference is made to n-bit ALUs. Typical values for n are 8, 16, 32 and 64. According to embodiments of the invention, all object IDs have a fixed length, in particular an identical length, which is preferably selected such that each object ID fits completely into the working register of the ALU, and may be compared with each other in the course of set operations in the ALU. In particular, to compare two sets of object IDs, e.g., to calculate an intersection set, a union set, a difference set, or a symmetric difference set, the ALU may compare all object IDs of one set to all object IDs of the other set to check for identity.

The term "raw data" here means any data that is available in electronic form and not yet in a form parsed by a parser of the DPS system. In particular, the raw data comprise data which are obtained directly during an observation, a measurement or a data collection and which are still present in unprocessed form. However, the term "raw data" for the purposes of the present invention also includes data that have been derived from the primarily collected data, wherein the derivation was performed, however, by a parser used to import data into the DPS system. Thus, raw data means data of which the extraction and storage were typically generated and stored entirely independently of the existence or intervention of a DPS system.

The term "access addresses" are defined here as information that enables a data processing system to access, at least read, data that has been made available under these access addresses. An access address may be, for example, a URL to a file available via a network, a local file-system-based address of the file, an indication of the name of a database and database table located therein with a specific data set, or the like.

A "data processing and search system—DPS system" is understood herein to be a software and/or hardware-based system for storing, managing and processing electronic data. According to embodiments of the invention, the DPS system is designed to store large quantities of data efficiently, without contradiction, and permanently. According to embodiments, the DPS system may comprise a plurality of components, which may be formed as modules: an import component for receiving and parsing raw data and for storing the parsed data in non-redundant lists. Here, the import component may use existing lists and, if necessary, create new lists automatically. The DPS system may additionally comprise a search and analysis component for searching and/or analyzing the lists. Optionally, the DPS system may include a GUI that allows users to enter the raw data to be parsed and/or concept-data value pairs (key-value pairs) to be imported and/or search terms and/or analysis commands. The DPS system has read and write access to a data storage device managed by said system. According to embodiments, the DPS system comprises the data storage device and lists stored therein. Optionally, the DPS system may further comprise a document store for storing at least some of the raw data.

A "data object" or "data set" is understood here to be a group of data values with related content (belonging to an object), e.g. article number and article name and date of manufacture. Data sets correspond to a logical structure of data values that was defined when the data of a data object were stored or that is only recognized when data are parsed. If the parsed raw data are images, for example, the individual recognized objects depicted in the image may be "data objects" within the meaning of the invention. However, it is also possible that the matrix of pixel information of an image in its entirety constitutes the data object "image". In this case, the digital image is the data object and an identifier of the image may be used as the object ID.

The data objects contained in the raw data thus include data sets explicitly identified as separate objects in the raw data (e.g. individual rows of an Excel table with data sets oriented row-by-row) as well as data objects dynamically recognized and extracted in the course of the parsing process. The latter represent data objects "implicitly" contained in the raw data.

A "data value" is understood here to be the smallest evaluable unit of a data set. What is considered the smallest evaluable unit depends on the application context, e.g., on the parser that is to recognize and extract the data values and optionally their semantic meaning in the raw data. For example, an image analysis parser might be configured to recognize patterns of a digital image at bit level. In this case, the data values would be binary values linked with pixel position data. According to another example, the parser could recognize patterns based on intensity values of individual pixels. Then, a data value could be an intensity value at a particular pixel position. Depending on the nature of the raw data, the data value could be a sequence of alphanumeric characters (e.g., a word, a peptide sequence, a nucleotide sequence), a number (e.g., weight or size information), or a binary object (image, audio, or video file).

A "parser" is understood herein to mean a computer program or program module responsible for breaking down and converting an input into a format more suitable for further processing. In particular, a parser may serve to recognize the meaning (the semantics, the semantic concept) of data values explicitly or implicitly contained in the input and to pass on the recognized semantic concept of an extracted data value linked to this data value for further processing. Typically, a parser outputs the raw data it processes in a desired form that contains additional semantic information. For example, parsers used to import data into a DPS system may output the parsed data values and their semantic concepts in the form of key-value pairs, which are then stored in existing lists or are used as the basis for automatically creating new concept lists. However, a parser may also be a purely syntactic parser that processes a data structure with raw data according to a specific breakdown and/or extraction scheme to extract one or more data values from the raw data.

A "redundancy-free" data value list is understood here to mean a list of data values that contains each data value only once.

A "data storage device" is a storage medium or a storage area on a storage medium or a combination of several storage media or storage areas that is/are used to store data. If the data storage device comprises several storage media or storage media areas, these may be interconnected to form a logical data storage device. In this case, the storage media or storage media areas may be operatively connected to each other, for example, via a network or via a bus of a computer system. For example, a data storage device managed by the DPS system may be a data storage device to the data of which the DPS system has exclusive access.

A "concept list" is understood here to mean a non-redundant and preferably sorted list of data values, wherein each concept list represents a specific semantic concept and contains only data values to which this semantic concept was assigned during import. The object IDs assigned to a specific data value or list element in a concept list comprise only object IDs of data objects that contained this data value or list element and to which this semantic concept was assigned during import.

A "concept-free list" is understood here to mean a non-redundant and preferably sorted list of data values that does not represent any semantic concept and contains data values to which no semantic concept was assigned during import. The object IDs assigned to a specific data value or list element in the concept-free list comprise only object IDs of data objects that contained this data value or list element and to which no semantic concept could be assigned during import.

A "global list" is understood here to be a non-redundant and preferably sorted list of data values in which one or more pointers are assigned to each data value in the global list, wherein each of the pointers points to an element of one of the concept lists or an element of the concept-free list that includes a data value identical to this data value of the global list.

Here, a "semantic concept" is understood here to be a meaning content that may be realized in various specific embodiments. For example, a semantic concept may denote a class of objects or processes that comprises multiple elements. Depending on the type of raw data and/or the parser used, a variety of different concepts may be assigned to the parsed and imported data values. For example, in the case of medical data, a semantic concept might be a diagnosis that includes various specific embodiments (data values) such as "diabetes", "Parkinson's disease", or "skin cancer". Another semantic concept could be "symptom" and includes embodiments or data values such as "fever", "chills", "toothache".

The "import" of parsing results by the DPS system is understood here to mean the process of receiving parsing results from one or more DPS-system-external parsers by the DPS system. If one or more of the parsers are internal components of the DPS system, the import is the transfer of the parsing results from this or these parsers to the DPS system modules responsible for storing the results in the form of the redundancy-free lists.

A "computer system" is understood here to mean a monolithic or distributed data processing system, in particular a digital data processing system. The data processing system may thus consist, for example, of a standalone computer system or a computer network, in particular a cloud system. The computer system may also be, e.g., a mobile data processing system, e.g., a notebook, tablet computer, or portable telecommunications device, e.g., a smartphone.

A "system" is understood here to be a totality of one or more elements that is capable of processing data. For this purpose, the system components exchange data and/or control commands. For example, a system may comprise a computer with a DPS system. Optionally, the system may include further components, such as one or more client computer systems that send search requests and/or analysis requests to the DPS system, and/or source systems that each contain some of the raw data that are transformed by the DPS system and parsers into the non-redundant data value lists.

BRIEF DESCRIPTION OF THE DRAWING

Embodiments of the invention are described below with reference to the drawing. In the drawing

FIG. 3 shows a multitude of data structured with raw data of different structure and different content;

FIG. 4 shows a block diagram of a selection of some of the lists generated by the DPS system;

FIG. 6 shows a screenshot of a GUI of a DPS system with search results for a regular expression;

FIG. 7 shows a screenshot of a GUI of a DPS system with different search options.

FIG. 1 shows a block diagram of a system 100 comprising a DPS system 102 according to an embodiment of the invention.

Figure 1:
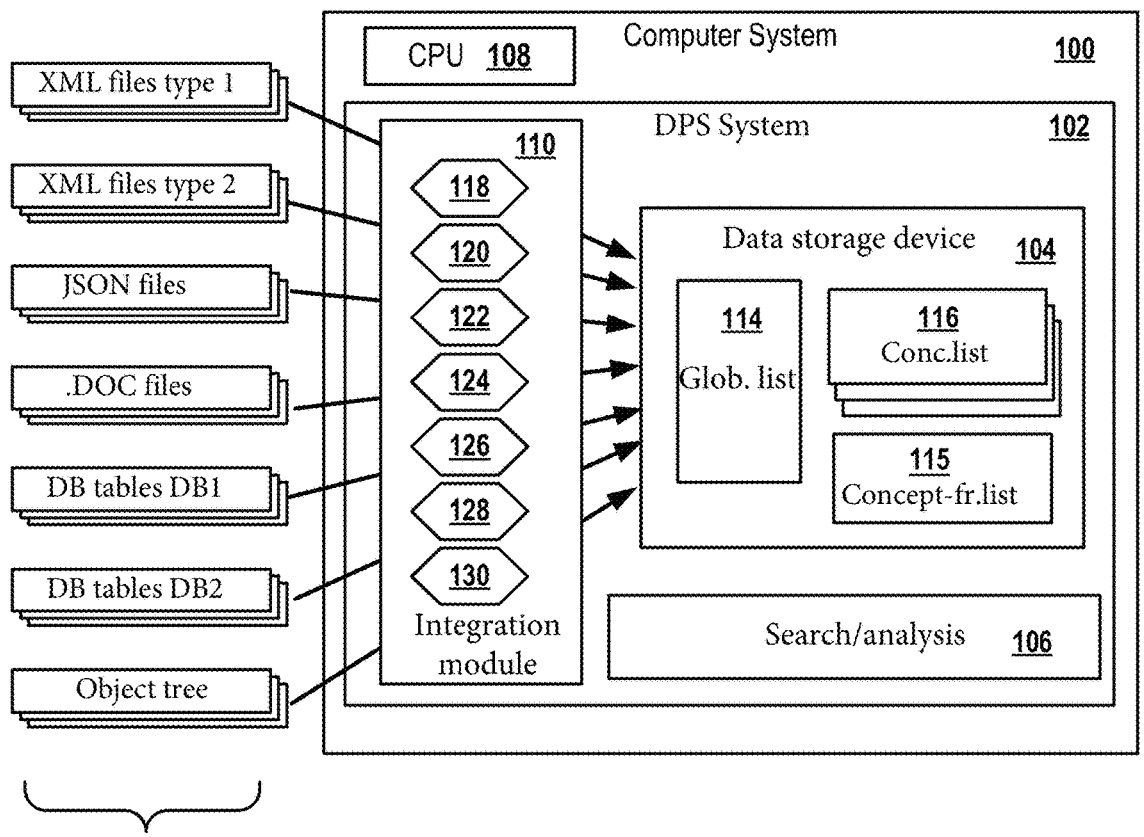
FIG. 1 shows a block diagram of a system comprising a DPS system.
Figure 2:
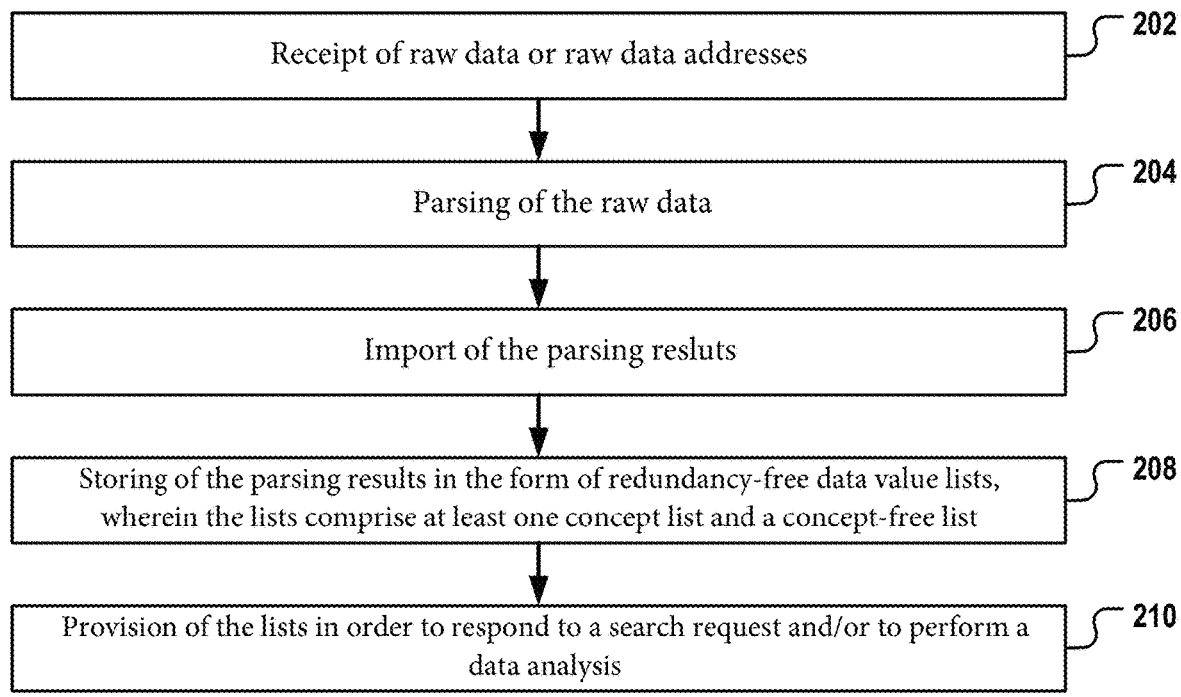
FIG. 2 shows a flow diagram of a method for storing data.

For example, the method for storing and searching data as described in the flow diagram of FIG. 2 may be performed by a system 100 as shown in FIG. 1. Therefore, the system 100 and the method of FIG. 2 are described together below with reference to the two figures.

For example, the system and method may be used to integrate a large amount of heterogeneously structured raw data 112 and make it searchable and analyzable in an efficient and flexibly extensible manner. For example, the raw data may include XML files of various content and various structuring, JSON files, text files in various formats (for example, Microsoft Word, OpenOffice, Adobe Acrobat PDF files, TXT files, etc.), various tables from one or more different relational databases, media data, or hierarchically organized data, for example, object trees. In some embodiments, the raw data may also be entered via a user interface of the DPS system. Typically, the raw data originates from multiple independent data sources, for example, various organizations, particularly companies, institutes, and government agencies. In some raw data, data objects, their data values, and optionally also their semantic meaning may be explicitly identified to a greater or lesser extent, for example, in database tables, Excel files, and other comparatively highly structured data with corresponding fields. In other raw data (for example, image data), the data objects and their data values may not be provided explicitly, but implicitly. This means that the data objects and their data values are only recognized and extracted as such in the course of the parsing process.

A plurality of different syntactic and/or semantic parsers 118-130 are provided to parse the various raw data. For example, the parsers may be part of an integration module 110 of the DPS system 102. It is also possible that the parsers are external components, the execution of which is initiated and controlled by the DPS system. In order to parse the raw data, the parsers 118-130 used required at least read access to the raw data in question. During parsing, the parsers are preferably in exchange with the DPS system or other components of the DPS system, e.g., in order to be able to determine during dynamic creation of an object ID for a data object whether this ID is really unique or is already occupied by an object ID that is used as a reference in one of the data value lists.

In a first step 202, the DPS system 102 and/or the parsers under its control receive the raw data 112 or at least access addresses to these raw data. The access addresses allow at least read access to the raw data. For example, the raw data may have been generated or captured in one or more source systems connected via a network, and transmitted to the computer system 100 via a network, such as the Internet. In some embodiments, the raw data are stored in copy by the DPS system, for example, for the purpose of later reprocessing by additional and/or improved versions of existing parsers. However, the raw data are not directly processed to answer search requests.

The parsing and import of the different raw data may be performed in parallel, but it is also possible that the different raw data are processed one after the other and even in large time intervals, depending on the availability of the raw data and/or the parsers used for parsing.

In step 204, the raw data are processed by a multitude of parsers 118-130 to extract data objects, their object IDs, and one or more data values contained in each of the data objects. For example, there may be different parsers for Excel files, text files, image files, various XML files, and database tables. The object IDs may be identifiers of data objects that are already specified by the raw data, and are adopted by the DPS system as object IDs. Alternatively, the object IDs may also be generated during parsing. For example, several data sets may be stored row-by-row in an Excel table. A parser of this Excel table may be configured to interpret each row of the Excel file as a data object and to use the combination of file name and row number of the row containing the data set/data object. If certain semantic concepts are already explicitly assigned to the extracted data values in the raw data (for example, by corresponding field or column identifiers), the particular parser responsible assigns the semantic concept that the extracted data value embodies to the extracted data values. Since the parser uses certain field identifiers as semantic concept and the DPS system automatically generates corresponding concept lists if the concept does not already exist in the form of a concept list in the data storage device, the DPS system automatically learns new semantic concepts. The data values extracted from the raw data during parsing are stored in the concept lists according to the semantic concept assigned to them by the field identifiers. However, it is also possible that a parser does not recognize data objects and data values that are not explicitly contained in the raw data until a complex parsing process is performed. Similarly, it is possible that a parser does not recognize to which semantic concept an extracted data value belongs. Thus, after performing the parsing step, the results may be in the form of (initially possibly redundant) data value lists, the elements of which are each linked with an object ID and optionally also are assigned a semantic concept.

In step 206, the DPS system, for example via an integration module 110, imports the results of the parsing process and stores the results in the form of non-redundant data value lists 114, 115, 116 in a data storage device or data storage area 104 managed by the DPS system.

These lists comprise one or more concept lists 116, typically a concept-free list, and optionally additionally a global list 115. Preferably, the data values within a list are sorted according to a particular order relation, for example alphabetically. The function and structure of the lists are described in greater detail with reference to FIG. 4. Due to this form of storage the object structure, thus the question of which data values and/or semantic concepts are present in a certain data object, resolves itself so to speak. Thus the data set may be compressed very strongly and may be extended at any time, without structural changes, by further data values and/or concepts which were made available in the form of additional raw data and/or additional parsers.

In step 210, the DPS system provides the redundancy-free lists 114, 115, 116 in order to answer a search request based on these lists and/or to perform analyses on the data values contained in the lists. For example, the DPS system that created the lists may include a module 106 for receiving and for processing search requests and/or a module for performing the analyses. For example, the module 106 may be configured to receive search requests via a network interface from one or more client computers or via a GUI directly from a user working locally. Additionally or alternatively, the module 106 may also include a multitude of complex analysis functions based on set operations on multiple concept lists and optionally also the concept-free list and the global list.

In other embodiments, it is also possible for the DPS system that created the lists 114, 115, 116 to transmit the lists 114, 115, 116 in original or copy form to a search and analysis system. The search or analysis system may be another instance of a DPS system, or may be another hardware and/or software-based data processing system with an interface for receiving and processing search requests and/or analysis commands. This other search and analysis system may optionally also include parsers and an interface for importing parsing results, but need not include these components.

FIG. 3 shows data structures with raw data, wherein the data structures have a different structure and different content.

For example, the data structures 302, 304, and 306 are product datasheets of motors from a manufacturer in JSON format (shown here as a tab-delimited text file for space reasons). For example, the parsing process may be performed in such a way that each one of the three JSON files 302, 304 and 306 is interpreted as a separate data object, each with an object ID. Each data object contains multiple key-value fields, such as a specific data value for the semantic concept "power", a specific data value for the semantic concept "torque", etc.

The data structure shown therebelow is an Excel table with a specification of various properties of paints of a paint dealer. Each row 308-313 contains exactly one data object (data set). During the parsing process, each recognized data object may be assigned, for example, the row number in combination with an identifier of this Excel table as object ID.

Some of the raw data may be in the form of text data, for example text files 314-318. For example, a purely syntactic parser could be used to break down this text into individual words (each of which acts as a data value). For example, the syntactic parser may be a tokenizer that breaks down natural language text into words that (apart from some stop words, if necessary) are used as data values. In this case, no semantic concept is initially assigned to the words/data values during import, and the words and the object ID of the particular source object are stored in the concept-free list, wherein each word occurs only once in this list.

Another part of the raw data may be provided, for example, in the form of commercial register extracts 320-324. These may contain a mixture of key-value fields and free text.

The raw data originate from different sources, but some have overlapping content ("Gelb-AG"), and some have ambiguous data values ("silver"). Nevertheless, embodiments allow an efficient integration and processing of all these data while resolving semantic ambiguities.

FIG. 4 shows a block diagram of a selection of some of the data structures generated by the DPS system on the basis of the raw data shown in FIG. 3. The data values shown in the redundancy-free lists 114, 115, 116 are also only a selection; typically the lists are considerably longer.

All data value lists 114, 115, 116 generated and managed by the DPS system are redundancy-free, i.e., they contain each data value only once. Preferably, the data values are also sorted so that a sequential search of the lists may be aborted if, based on the sorting of the search term in the order and the data values of the list that have already been searched, it is excluded that a further search of the list will result in a hit.

For example, the following semantic concepts were ascertained by the parsers while processing the raw data: color, manufacturer, paint ID, last name, relation types, and metal types. These semantic concepts are represented, respectively, by the concept lists 402, 404, 406, 408, 410, and 412.

The concept-free list 115 contains data values to which no semantic concept could be assigned during parsing. If, for example, the parser of the message text 314 is a pure tokenizer of a text into words which does not recognize the meaning of the words, the words determined by this parser are "concept-free" and are stored in non-redundant form in the concept list. Thus, if the text 314 mentions a "Gelb-AG" without the parser used recognizing the semantic meaning of this term, this data value is stored in the concept-free list, wherein reference is made to the data object 314. It is possible that the same data value "Gelb-AG" is also contained in other raw data, wherein, when parsing these other raw data, it is possible to assign a semantic concept to this data value. For example, the data value "Gelb-AG" is also contained in the commercial register extract 320 under the field identifier "company". For example, the commercial register parser and/or the DPS system may be configured to consider the semantic concepts "company" and "manufacturer" as synonyms of the same semantic concept, such that the data value "Gelb-AG" is stored in the concept list 404 for the concept "manufacturer" linked with the object ID on data object 302. If a data value already exists in the list, only the set of object IDs assigned to this data value is supplemented accordingly.

Based on the concept-free list 115 as well as some other lists shown in FIG. 3, it is evident that the list data values are sorted by different data objects and that the sorting of the data values in the lists is independent of the origin of the data values from specific data objects. Thus, the original structure of the data objects in the raw data was completely dissolved in structural terms when the lists were generated, because the assignment of data values to the data objects is only still present and reconstructable in the form of the object IDs.

Optionally, in some embodiments, position data of data values within the particular data object may also be stored with the object IDs in the lists 115-116, and therefore the position of the data values within the data objects may also be reconstructed in the raw data.

The redundancy-free data value lists preferably also comprise a global list 114. This does not contain object IDs and is used to assign data values to one or more semantic concepts and the corresponding concept lists. For example, the data value "silver" in the global list is assigned to the concept lists "color," "last name," and "metal type," whereas the data value "Stolze" is assigned only to the concept list "last name. For example, the global list may be used to dynamically display various semantic concepts that include a particular search term when the search term is entered and/or to limit the data values evaluated during a database search or data analysis to those data values that represent a particular semantic concept.

Preferably, the lists also comprise one or more concept lists 410 representing the relations of data objects. Here, the data value consists of a concatenation of the relation type (for example, "Installable in") and an object ID (for example, identifiers of motor types MF-3000, . . . , MF6000). The relation specifies in which motor type a certain component (specified in a data object from which this relation was extracted during parsing) may be installed. A search request with the search value "Installable_in_MF_3100" now quickly returns all object IDs of data objects representing motor components that may be installed in the motor of type MF_3100. Thus, a highly efficient search facility for all possible relation types of objects is provided, which may also be used by data processing devices with little RAM and/or computing capacity.

Figure 5:
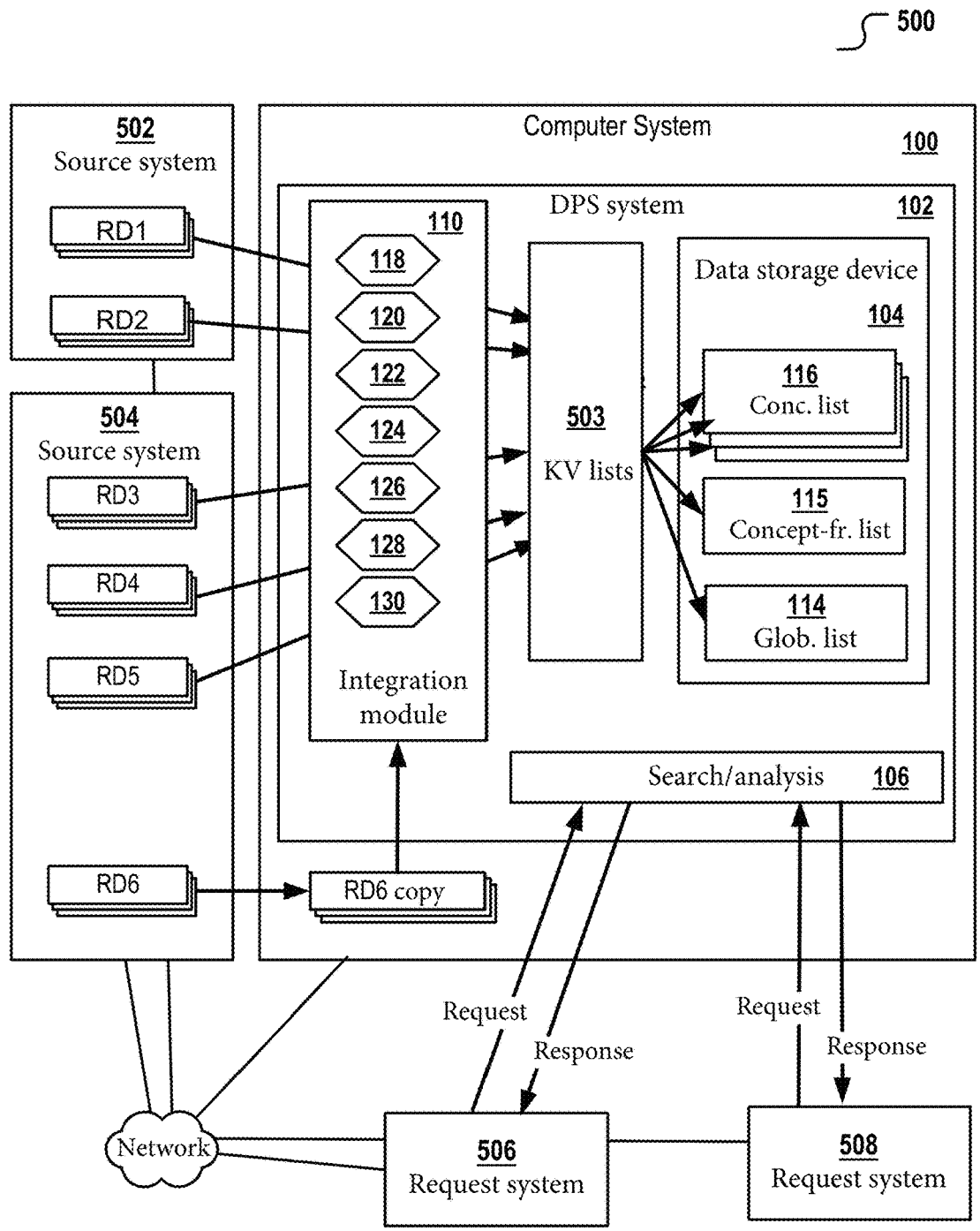
FIG. 5 shows a distributed computer system with DPS system clients.

FIG. 5 shows a distributed computer system 500 having DPS system clients 506, 508 that send search requests and/or analysis requests over a network to an interface 106 of the DPS system 102 and receive in response thereto a response, for example, a list of objects of which the data values meet the transmitted search criteria.

The raw data are provided by a plurality of source systems 502, 504 also over a network, for example, the Internet.

However, the system architecture 500 shown in FIG. 5 is only one of many possible architectures. Many alternative architectures are possible, for example, storing copies of the raw data on the same computer system 100 as the DPS system and/or using one or more local client request applications also instantiated on the computer system 100, in addition to or as an alternative to the network-connected client systems 506, 508. The parsers 118-130 may be an integral part of the DPS system or external software programs controlled by the DPS system.

For example, the parsers 118-130 may first generate, from the extracted information, key value (KV) lists which still contain the data values in redundant form e.g., color=green, weight=100 kg, music genre=classical, book=science etc.). Additionally or alternatively, the KV lists may be received via a GUI of the DPS system, such that the parsing process in this case lies simply in taking the given key value pairs and associating them with the object IDs of the data objects from which the key-value pairs are taken. For example, the GUI may allow a doctor to enter a diagnosis based on multiple symptoms. The "case" may be entered as a related data set (data object), wherein the key-value pairs "symptom=high blood glucose level", "symptom=low insulin concentration", "symptom=dizziness") and "diagnosis=diabetes" are stored in the concept lists "symptom" and "diagnosis", respectively, and may be assigned to the same case in a search request using the object ID of this "case".

However, in addition to reconstructing the data values of a particular case/patient, comprehensive statistical analyses may also be performed on data value lists that include the symptoms and diagnoses of hundreds of thousands of patients.

Thus, by means of efficient correlation analyses on the redundancy-free lists, performed, e.g., by intersection set formation of the object IDs of data values of several concept lists, new medical insights may be obtained.

All key value pairs 503 generated by the parsers 118-130 are preferably processed automatically, in standardized fashion and always in the same way and are transferred to the redundancy-free data value lists 114, 115, 116. Changes to the list structure or any indices (both of which usually have to be adapted in conventional DBMSs when integrating further data or new data sets with a previously unknown structure) are not required.

The totality of the data value lists thus represents a multidimensional model in which no data sets exist as separate entities, also structurally delimited from other data sets. The affiliation of data values to certain data objects is calculated exclusively by searching in the redundancy-free lists and/or via set operations on the object IDs of elements of these lists.

For example, a search request may contain the following search criteria regarding entries in a phone book: "first name=/[CK].*ristin/", "street="/.*[Aa]llee.*/" and "house number=/14/". The search request thus contains two regular expressions as search criteria that allow "fuzzy matches", as well as a data value "14" that must be exactly fulfilled. The DPS system is configured to identify those concept lists to which the search criteria of the search request are to be applied (i.e., first name, street and house number, in this case) and then, depending on the type of criterion, to perform a fuzzy search or a search for identical values in the data values of the respective concept lists. Such a search is not only very fast, but also has the advantage that typos or spelling variants in the name do not cause the phone book entry (data object) that meets the search criteria to be overlooked, provided that the typo is still covered by the regular expressions.

Figures 6, 7:
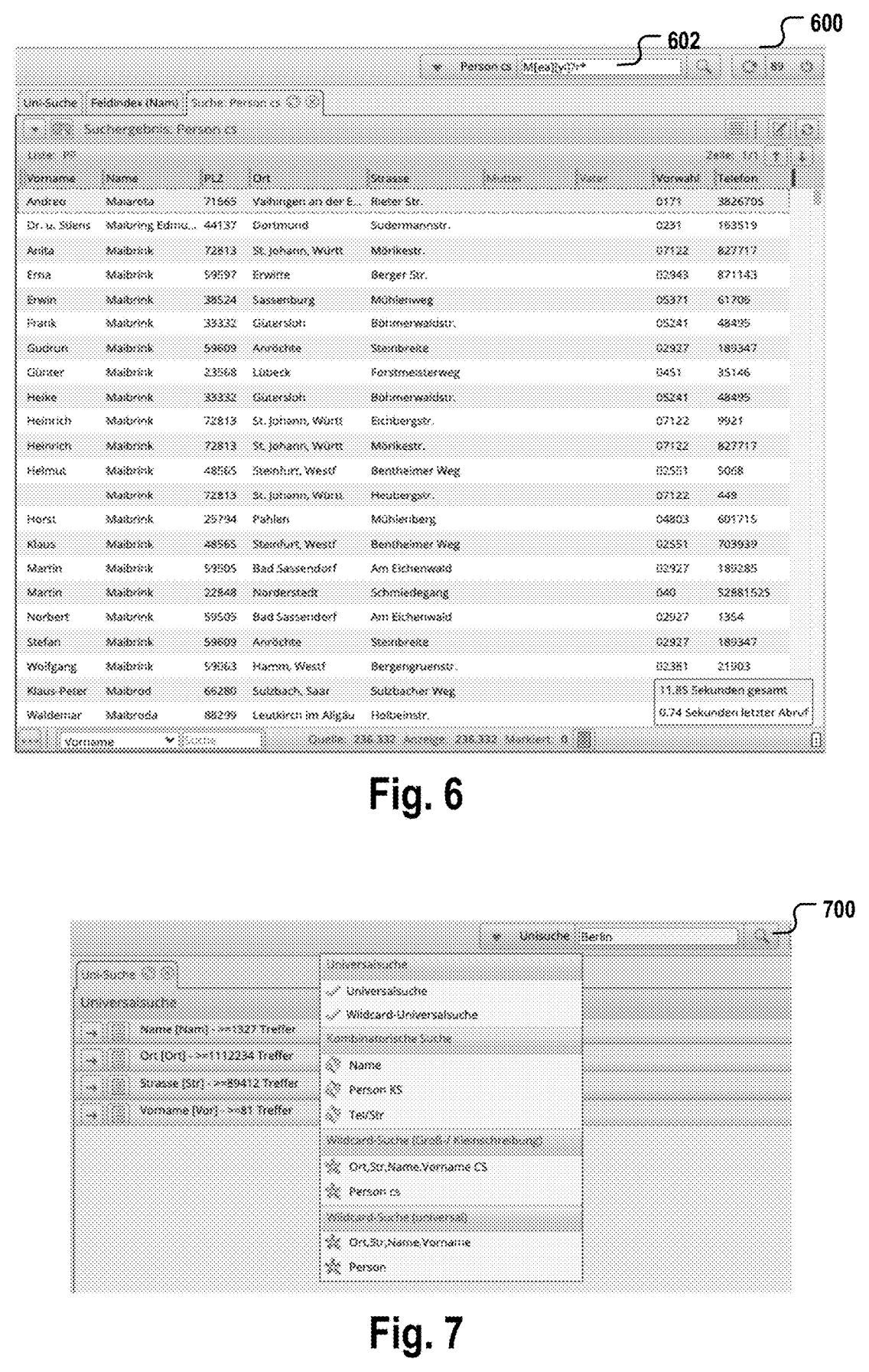

FIG. 6 shows a screenshot of a GUI 600 of a DPS system with search results for a regular expression according to an embodiment.

In the example shown here, a raw data set of size 8.9 gigabytes has been parsed and transformed into non-redundant lists of size 4.42 gigabytes. The raw dataset consisted of a set of comma-separated files, each of which contained a variety of phone number data sets, wherein the columns each contained different semantic concepts such as last name, first name, street, house number, zip code, city, area code, and phone number. These data were transformed into a global list, as already described for embodiments, and the following concept lists, each containing only non-redundant data values: first name, last name, zip code, city, street, area code, and phone number. In addition, relations to other data objects (data sets) were defined for some of the data sets (data objects), in this case "mother" and "father" relations.

The GUI allows a user to formulate various search requests that may include search criteria related to one or more of the lists and which may be used in different search modes (identity or matching on a regular expression), wherein the search mode may be chosen individually for each of the concept indices.

In the example shown in FIG. 6, a regular expression is entered into the search field 602 and is used to search the redundancy-free concept list "last name" for a regular expression. All data values contained in the concept list "last name" that "match" the regular expression, as well as the object IDs assigned to these match data values in this concept list, are ascertained in a first step. This first step takes only 0.7 seconds because it is not necessary to search 89 gigabytes of raw data, but only a sorted last name list with 3.2 million different data values. In a second step, the totality of object IDs ascertained in the first step is used to output the data objects (data sets) that represent a person with a "matching" last name. The output of these sets takes about 11 seconds in the example shown here. It should be taken into account that these runtimes were measured on a MacBook Air computer with 8 GB Ram, year of manufacture 2012, on which a web server and various other programs were running in addition to the DPS system for data search, wherein the non-redundant lists are stored on an external SSD storage device connected to the notebook via USB. The search with a regular expression thus ran with a runtime of less than one second on a notebook several years old and not on a dedicated database server.

The use of non-redundant data value lists thus has the advantage that not only an identity search but also searches with regular expressions may be carried out very performantly. However, the specific data organization in the form of non-redundant data value lists supports a variety of other search requests, some of which are shown in FIG. 7.

FIG. 7 shows a screenshot of a GUI 700 of a DPS system with different search options. On the one hand, the user has the option to perform a "global search", here called a "universal search". In the universal search, a search term for an identity search or a search term in the form of a regular expression is entered. This is then searched in the global list, which contains the totality of all imported data values. For example, the global list will contain the search term "Berlin" a single time, wherein this data value in the global list refers to several concept lists "last name", "city", "street" and "first name", in which this data value occurs 1327 times, 1112234 times, 89412 times and 81 times, respectively. By contrast, the data value "Berlin" does not occur in the concept lists "house number" and "zip code". The 81 hits for the first name "Berlin" may be an indication of errors in the raw data, e.g., missing or incorrect delimiters that cause the field assignment not to be recognized during parsing.

Additionally or alternatively to the global search, the user may also define and perform any combination searches. A combination search allows the user to enter a search criterion for each semantic concept to be considered in the search (here, e.g., last name, personal abbreviation and phone number or street), wherein preferably each entry of a further letter in any of the search criteria already triggers a search for all search criteria already entered (in whole or in part).

The runtimes even for multiple regular expressions on several of the concept lists are in the range of a few seconds to fractions of seconds, depending on the type of expression. Remarkably, no index needs to be created and no adjustment to the structure (or indexing) of the lists needs to be made, depending on the number and type of semantic concepts to be used for searching. In many conventional DBMSs—in addition to the relational data in table form, the size of which would be roughly equivalent to the 8.9 GB of raw data—a large number of search indices would have to be created in addition to the tables. Thus, the effective memory consumption of a conventional relational DBMS supporting the same multiplicity of search requests is many times higher than the 4.42 GB consumed by the DPS system according to the embodiment described herein to allow any combinatorially possible search request on the global list and/or the concept list and/or the concept-free list.

In another example, a 550 GB raw dataset containing 1.4 billion cab trip data sets (including time and location information for starting point and destination, number of passengers, and amount paid) was transformed into a set of non-redundant lists that had a total size of 396 GB. The data sets (data objects) of the raw data each referenced a cab zone that served as the start zone and another that served as the destination zone. Despite the immense size of the data pool, the runtime to determine the total number of all cab trips that have a particular zone as a start zone or as a destination zone was only 0.01 seconds, thanks to the list organization described above.

Figure 8:
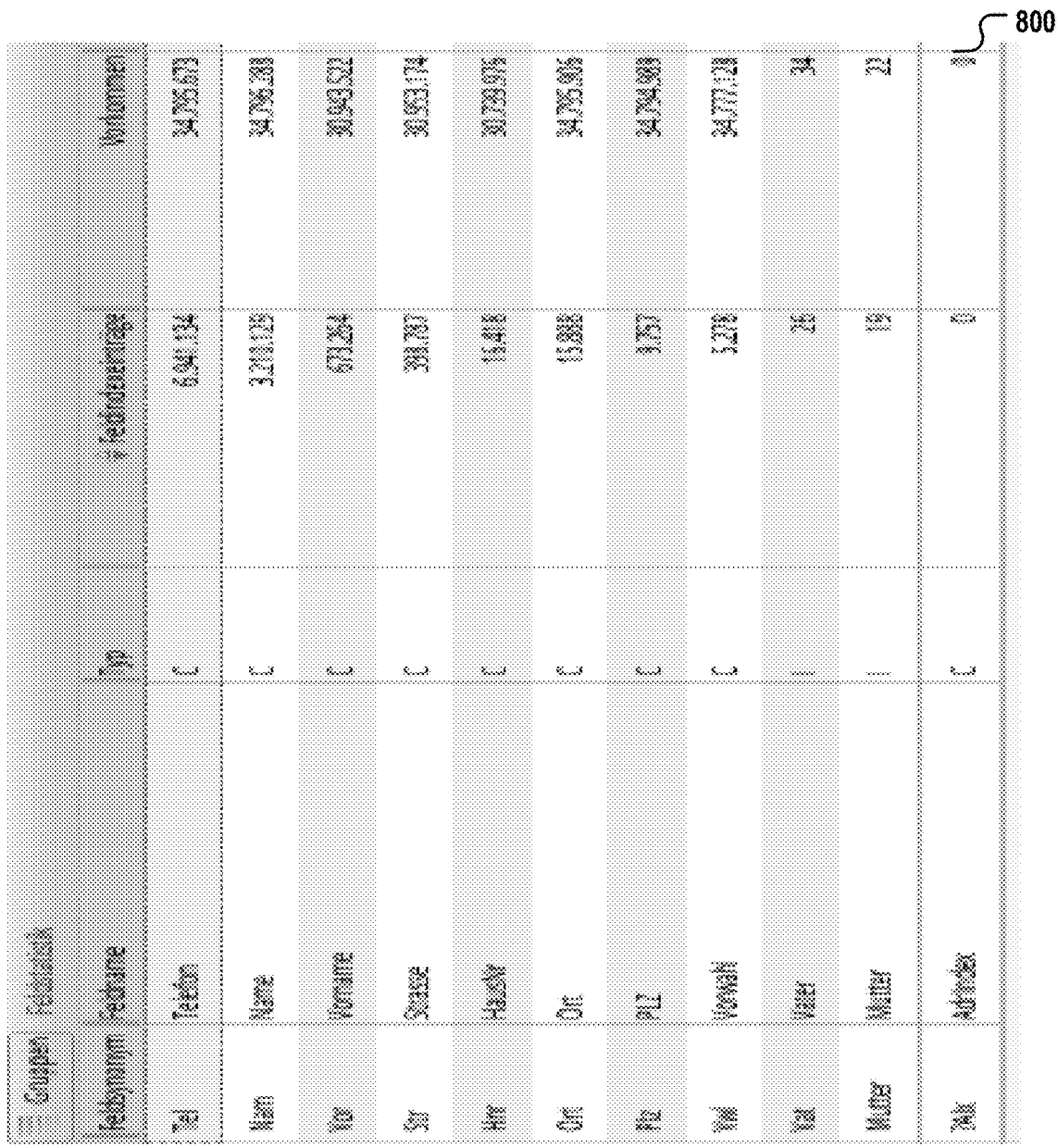
FIG. 8 shows a screenshot of a GUI of a DPS system, wherein the GUI combines the content of the concept lists.

FIG. 8 shows a screenshot of a GUI 800 of a DPS system, wherein the GUI summarizes the content of the concept lists. The column "Field name" contains the name of the concept lists that are managed by the DPS system and used for searching. This name is identical to the semantic concept represented by this concept list. The number of different data values in the particular concept list is shown in the column "Field index entries". In the concept list "Phone number", 6941134 different phone numbers (without area code) occur. In the concept list "Last name", 3210129 different last names occur. In the concept list "First name", 673264 different first names occur. The totality of (different, i.e. non-redundant) object IDs assigned to the totality of data values in the particular lists is shown in the "Occurrences" column. Thus, the raw data contain 34795673 data objects (data sets) that have a data value in the "Phone number"

field, wherein a total of 6941134 different phone numbers are contained and extracted in the totality of these "Phone number fields".

The invention claimed is:

1. A method for storing data in a data storage device, wherein the method comprises:
   receiving raw data or access addresses for the raw data by a data processing and search system (DPS) system, wherein the raw data have different structures;
   parsing the raw data by a plurality of different parsers in order to ascertain data objects each having one or more data values, and an object ID of each of the data objects, wherein one semantic concept is assigned to each of at least some of the data values;
   automatically importing results of the parsing of the raw data by the DPS system;
   automatically storing all of the results of the parsing as redundancy-free data value lists in the data storage device by the DPS system, wherein the redundancy-free lists comprise:
      one or more concept lists, wherein each of the concept lists represents a particular semantic concept, and a non-redundant list selectively includes those of the imported data values to which the semantic concept of this concept list was assigned during parsing, wherein each of the data values in the concept list is assigned all of the object IDs of those data objects that include this data value, wherein the included data value is a representation of the semantic concept of this concept list;
      a concept-free list, wherein the concept-free list selectively includes those of the imported data values to which no semantic concept was assigned during parsing, wherein each of the data values in the concept-free list is assigned all object IDs of those data objects that include this data value, wherein no semantic concept could be assigned to the included data value of this data object during parsing; and
   providing the redundancy-free lists by the DPS system in order to respond to a search request and/or to perform a data analysis, wherein the search request and/or the data analysis is performed without access to the raw data, wherein the use of the redundancy-free lists to perform the requested search and/or the data analysis comprises,
   performing a set operation on sets of object IDs assigned to data values in two or more of the redundancy-free lists,
      wherein the set operation comprises a calculation of an intersection set, a union set, a difference set, or a symmetric difference set.

2. The method according to claim 1, wherein at least some of the raw data are present or received as a plurality of data structures, wherein the plurality of data structures particularly includes a mixture of two or more of the following data structures:
   XML file;
   JSON file;
   text file;
   CSV file;
   database table;
   object tree;
   media file, the media file including at least one of a video, audio and/or image file;
   data received via a GUI; and
   streaming data.

3. The method according to claim 1, wherein the redundancy-free lists further comprise:
   a global list, wherein the global list is a redundancy-free list of all imported data values, wherein each data value in the global list is assigned one or more pointers, wherein each of the pointers points to an element of one of the concept lists or an element of the concept-free list that includes a data value identical to this data value;
   wherein the DPS system is configured to perform the analysis or the requested search at least also on the global list, wherein the global list serves for recognition and/or for concept-specific processing of data values that represent different semantic concepts in various data objects.

4. The method according to claim 1,
   wherein at least some of the data values are extracted from fields of data structures that include the raw data, wherein the fields are defined by the data structures, wherein the fields comprise one or more concept-related fields and/or one or more concept-agnostic fields, wherein a concept-related field is a field assigned a field identifier, wherein the field identifier represents a semantic concept; and/or wherein a concept-agnostic field is a field that is free of a semantic meaning assignment,
   and/or wherein at least some of the data values are imported by semantic parsers that recognize the imported data values as well as the semantic concept assigned to them on the basis of a data analysis, wherein the data analysis is an image analysis, an audio signal analysis, a statistical analysis, a classification method, a machine learning method, and/or a pattern recognition method,
   wherein the DPS system stores those of the data values extracted from the concept-related fields in that one of the concept lists that represents the semantic concept of the field identifier of those concept-related fields; and/or
   wherein the DPS system stores those of the data values extracted from the concept agnostic fields exclusively in the concept-free list if the parser used does not recognize a semantic concept of the data value.

5. The method according to claim 1, further comprising:
   after the data values are imported and stored, providing a further parser which is designed to recognize and import data values assigned to at least one new semantic concept, wherein a new semantic concept is a concept not represented by any of the concept lists currently contained in the data storage device;
   processing the raw data by the further parser, wherein one or more new data values are extracted from the raw data assigned to the at least one new concept;
   comparing the at least one new semantic concept recognized by the further parser with the concept lists in the data storage device by the DPS system and automatically generating and storing a new concept list for each of the at least one new semantic concept for which the further parser has extracted at least one data value; and
   automatically storing the data values extracted from the raw data by the further parser into those of the at least one new concept list representing the new semantic concept that the further parser has assigned to this data value.

6. The method according to claim 1, further comprising:
   receiving a search request for ascertaining data objects that satisfy one or more concept-related search criteria and/or one or more concept-agnostic search criteria, wherein a concept-related search criterion is a search criterion to which an identifier of a semantic concept is assigned, wherein a concept-agnostic search criterion is a search criterion to which no semantic concept is assigned;

searching the concept-free list for one or more data values that satisfy each of the received concept-agnostic search criteria; and/or for each of the received concept-related search criteria, searching selectively those of the concept lists representing the semantic concept of this search criterion for one or more data values satisfying the concept-related search criterion;

returning the object IDs or a subset of these object IDs assigned to data values ascertained during the search of the global list and/or the at least one concept list in response to the search request by the DPS system.

7. The method according to claim 1, wherein at least some of the data objects are related to other data objects;

wherein, in the course of parsing the raw data and/or in the course of a data processing operation performed later on the raw data and/or the data values of the already stored redundancy-free lists, the DPS system performs an extraction of the object relations of these data objects to other data objects, wherein each extracted relation of one of the data objects—herein called the first data object—to another of the data objects—herein called the second data object—is extracted as a combination of a relation type and the object ID of the second data object, and wherein each of the extracted combinations is stored as one of the data values in the concept-free list and/or in the at least one concept list, wherein in the concept-free list and/or the at least one concept list each of the extracted combinations is assigned the object IDs of those of the first data objects to which the relation designated in the combination exists.

8. The method of claim 7, further comprising:

receiving a search request or an analysis command to ascertain all data objects that have a relation to a search data object, wherein the request or the command contains a search object ID;

searching the global list to ascertain all data values that consist of a combination of a relation type and an object ID that is identical to the search object ID;

identifying one or more concept lists referenced by the data values ascertained in the global list;

searching the one or more identified concept lists to ascertain data values that consist of a combination of a relation type and an object ID that is identical to the search object ID; and returning the object IDs assigned to the ascertained data values in the one or more concept lists, i.e. IDs of those data objects that have a relation to the search object.

9. The method according to claim 1, further comprising:

providing a mapping table by the DPS system, wherein the mapping table assigns one or more identifiers to each data value in the concept-free list and to each data value of the concept lists, wherein the identifiers are values of which the length and/or type depends on the processor architecture of the computer system used for searching and/or analysis;

generating obfuscated copies of the concept-free list and each of the concept lists by the DPS system, wherein in the obfuscated copies the data values are each replaced by an identifier assigned to this data value in the mapping table; and using the obfuscated lists to perform the search request and/or analysis by the DPS system.

10. The method according to claim 1, further comprising:

encrypting the concept lists and the concept-free list by the DPS system, or encrypting the obfuscated concept lists and the obfuscated concept-free list by the DPS system;

in response to receiving the search request or a data analysis command, identifying those of the encrypted lists that need to be processed to handle the search request or the data analysis command;

authenticating the sender of the search request to the DPS system, wherein the DPS system checks individually for each of the identified lists whether the sender is authorized to access the contents of the list;

generating, by the DPS system, decrypted copies selectively of those of the identified lists for which the sender has authenticated themself as authorized to access;

performing the search request or the data analysis on the decrypted list copies; and after performing the search request or the data analysis, deleting the decrypted list copies by the DPS system, wherein preferably the DPS system uses a different encryption key for encrypting each of the lists.

11. The method according to claim 1, wherein at least one of the concept lists represents genomic markers of a plurality of individuals of a species or sub-species, wherein at least another of the concept lists represents metabolic or phenotypic characteristics of these individuals, wherein the DPS system performs the data analysis using set operations on the lists, and wherein the data analysis includes a correlation analysis of genomic markers on the one hand and the metabolic or phenotypic characteristics on the other hand; or wherein at least some of the data values of the global list and/or the at least one concept list specify an "is-part-of" relation to other objects including an object ID of this other object, wherein at least another one of the concept lists represents metabolic or phenotypic characteristics of these individuals, wherein the DPS system performs the requested search, and wherein the search criterion includes a combination of the relation type "is-part-of" and an object ID, wherein the object ID of the search criterion represents a machine or a vehicle or a multi-component part of this machine or the vehicle; or wherein at least some of the data values of the global list and/or the at least one concept list are words of a natural language, wherein the DPS system performs the data analysis using set operations on the lists, and wherein the data analysis includes a correlation analysis of words to create a predictive model of this natural language.

12. The method according to claim 1, wherein the data values in the redundancy-free lists are sorted.

13. A computer system for storing data comprising:

at least one processor;

a data storage device;

a data processing and search system (DPS) system, wherein the DPS system is designed to manage and search the data stored in the data storage device and is designed to cause the at least one processor to perform a method comprising:

receiving raw data or access addresses for the raw data by the DPS system, wherein the raw data have different structures;

parsing the raw data by a plurality of different parsers in order to ascertain data objects each having one or more data values, and an object ID of each of the data objects, wherein one semantic concept is assigned to each of at least some of the data values;

automatically importing results of the parsing of the raw data by the DPS system;

automatically storing all of the results of the parsing as redundancy-free data value lists in the data storage device by the DPS system, wherein the redundancy-free lists comprise:

one or more concept lists, wherein each of the concept lists represents a particular semantic concept, and a non-redundant list selectively includes those of the imported data values to which the semantic concept of this concept list was assigned during parsing, wherein each of the data values in the concept list is assigned all of the object IDs of those data objects that include this data value, wherein the included data value is a representation of the semantic concept of this concept list;

a concept-free list, wherein the concept-free list selectively includes those of the imported data values to which no semantic concept was assigned during parsing, wherein each of the data values in the concept-free list is assigned all object IDs of those data objects that include this data value, wherein no semantic concept could be assigned to the included data value of this data object during parsing; and providing the redundancy-free lists by the DPS system in order to respond to a search request and/or to perform a data analysis, wherein the use of the redundancy-free lists to perform the requested search and/or the data analysis comprises, performing a set operation on sets of object IDs assigned to data values in two or more of the redundancy-free lists, wherein the set operation comprises a calculation of an intersection set, a union set, a difference set, or a symmetric difference set.

14. The computer system according to claim 13, wherein the at least one processor includes an arithmetic logic unit (ALU) which is designed to perform a set operation on sets of object IDs assigned to data values in two or more of the redundancy-free lists, wherein the set operation particularly comprises a calculation of an intersection set, a union set, a difference set, or a symmetric difference set.

15. The computer system according to claim 13, wherein at least some of the raw data are present or received as a plurality of data structures, wherein the plurality of data structures particularly includes a mixture of two or more of the following data structures:

XML file;
JSON file;
text file;
CSV file;
database table;
object tree;
media file, the media file including at least one of a video, audio and/or image file;
data received via a GUI; and
streaming data.

16. The computer system according to claim 13, wherein the redundancy-free lists further comprise:

a global list, wherein the global list is a redundancy-free list of all imported data values, wherein each data value in the global list is assigned one or more pointers, wherein each of the pointers points to an element of one of the concept lists or an element of the concept-free list that includes a data value identical to this data value;

wherein the DPS system is configured to perform the analysis or the requested search at least also on the global list, wherein the global list serves for recognition and/or for concept-specific processing of data values that represent different semantic concepts in various data objects.

17. The computer system according to claim 13, wherein at least some of the data values are extracted from fields of data structures that include the raw data, wherein the fields are defined by the data structures, wherein the fields comprise one or more concept-related fields and/or one or more concept-agnostic fields, wherein a concept-related field is a field assigned a field identifier, wherein the field identifier represents a semantic concept; and/or wherein a concept-agnostic field is a field that is free of a semantic meaning assignment, and/or wherein at least some of the data values are imported by semantic parsers that recognize the imported data values as well as the semantic concept assigned to them on the basis of a data analysis, wherein the data analysis is an image analysis, an audio signal analysis, a statistical analysis, a classification method, a machine learning method, and/or a pattern recognition method, wherein the DPS system stores those of the data values extracted from the concept-related fields in that one of the concept lists that represents the semantic concept of the field identifier of those concept-related fields; and/or wherein the DPS system stores those of the data values extracted from the concept agnostic fields exclusively in the concept-free list if the parser used does not recognize a semantic concept of the data value.

18. The computer system according to claim 13, wherein the DPS system is further configured to cause the at least one processor to perform:

after the data values are imported and stored, providing a further parser which is configured to recognize and import data values assigned to at least one new semantic concept, wherein a new semantic concept is a concept not represented by any of the concept lists currently contained in the data storage device;

processing the raw data by the further parser, wherein one or more new data values are extracted from the raw data assigned to the at least one new concept;

comparing the at least one new semantic concept recognized by the further parser with the concept lists in the data storage device by the DPS system and automatically generating and storing a new concept list for each of the at least one new semantic concept for which the further parser has extracted at least one data value; and automatically storing the data values extracted from the raw data by the further parser into those of the at least one new concept list representing the new semantic concept that the further parser has assigned to this data value.

19. The computer system according to claim 13, wherein the DPS system is further configured to cause the at least one processor to perform:
- receiving a search request for ascertaining data objects that satisfy one or more concept-related search criteria and/or one or more concept-agnostic search criteria, wherein a concept-related search criterion is a search criterion to which an identifier of a semantic concept is assigned, wherein a concept-agnostic search criterion is a search criterion to which no semantic concept is assigned;
- searching the concept-free list for one or more data values that satisfy each of the received concept-agnostic search criteria; and/or
- for each of the received concept-related search criteria, searching selectively those of the concept lists representing the semantic concept of this search criterion for one or more data values satisfying the concept-related search criterion;
- returning the object IDs or a subset of these object IDs assigned to data values ascertained during the search of the global list and/or the at least one concept list in response to the search request by the DPS system.

* * * * *